(12) United States Patent
Nakatani

(10) Patent No.: US 8,988,207 B2
(45) Date of Patent: Mar. 24, 2015

(54) INFORMATION ACQUIRING DEVICE

(75) Inventor: Koji Nakatani, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 13/884,364

(22) PCT Filed: Jul. 14, 2011

(86) PCT No.: PCT/JP2011/066129
§ 371 (c)(1),
(2), (4) Date: May 9, 2013

(87) PCT Pub. No.: WO2012/063526
PCT Pub. Date: May 18, 2012

(65) Prior Publication Data
US 2013/0229275 A1 Sep. 5, 2013

(30) Foreign Application Priority Data
Nov. 10, 2010 (JP) .................. 2010-251821

(51) Int. Cl.
| | | |
|---|---|---|
| *B60C 23/00* | (2006.01) | |
| *B60C 23/02* | (2006.01) | |
| *B60C 23/04* | (2006.01) | |
| *H01Q 1/22* | (2006.01) | |
| *H01Q 7/00* | (2006.01) | |

(52) U.S. Cl.
CPC ............ *B60C 23/02* (2013.01); *B60C 23/0452* (2013.01); *B60C 23/0498* (2013.01); *H01Q 1/2241* (2013.01); *H01Q 7/00* (2013.01)
USPC .......... 340/447; 340/442; 73/146.2; 343/848; 343/895

(58) Field of Classification Search
USPC .................... 340/447, 442, 445, 449, 426.33; 343/848, 895; 361/805, 807; 73/146, 73/146.3, 146.4, 146.2
See application file for complete search history.

(56) References Cited

U.S. PATENT DOCUMENTS 7,528,708 B2 * 5/2009 Saitou et al. ................... 340/449
2004/0066288 A1 * 4/2004 Okumura ...................... 340/445

(Continued)

FOREIGN PATENT DOCUMENTS

| CN | 1658429 A | 8/2005 |
| GB | 2461443 A | 1/2010 |
| JP | 2005-269608 A1 | 9/2005 |

(Continued)

OTHER PUBLICATIONS

International Search Report of corresponding International Application No. PCT/JP2011/066129, dated on Oct. 18, 2011.
Office Action received in Chinese Patent Application No. 201180054057.4, dated Jun. 4, 2014.

(Continued)

*Primary Examiner* — Hung T. Nguyen
(74) *Attorney, Agent, or Firm* — Global IP Counselors, LLP

(57) ABSTRACT

Electronic components, conductors, and the like that the form a detecting-and-transceiving circuit are positioned in a space inside a casing other than a space E that is enclosed by an imaginary surface that forms a predetermined angle θ with respect to a coil axis x toward the outside from a position on the edge of an aperture surface of the end part of a coil-shaped antenna 450 in the direction of the coil axis x. The angle θ is, e.g., 5° or more and is preferably 90°. Minute electronic components and conductors may be positioned within the space E if doing so does not dramatically change the magnetic current of the antenna 450.

11 Claims, 19 Drawing Sheets

(56) References Cited

U.S. PATENT DOCUMENTS

| | | | |
|---|---|---|---|
| 2004/0257213 A1* | 12/2004 | Tsujita | 340/445 |
| 2005/0099283 A1 | 5/2005 | Johnson et al. | |
| 2005/0179529 A1 | 8/2005 | Sato | |
| 2006/0049928 A1 | 3/2006 | Ening | |
| 2007/0222567 A1 | 9/2007 | Tupinier et al. | |
| 2009/0160629 A1 | 6/2009 | Shimura | |
| 2011/0292630 A1* | 12/2011 | Yamaguchi | 361/807 |

FOREIGN PATENT DOCUMENTS

| | | |
|---|---|---|
| JP | 2006-306184 A | 11/2006 |
| JP | 3962073 B2 | 5/2007 |
| WO | 2008/133018 A1 | 11/2008 |

OTHER PUBLICATIONS

European Search Report of corresponding European Application No. 11840403.7, dated on Nov. 4, 2014.

* cited by examiner

INFORMATION ACQUIRING DEVICE

CROSS-REFERENCE TO RELATED APPLICATIONS

This U.S. National stage application claims priority under 35 U.S.C. §119(a) to Japanese Patent Application No. 2010-251821, filed in Nov. 10, 2010, the entire contents of Japanese Patent Application No. 2010-251821 are hereby incorporated herein by reference.

BACKGROUND

1. Field of the Invention

The present invention relates to an information-acquiring device including an electronic-circuit body and a coil-shaped antenna inside a casing, and particularly relates to an information-acquiring device having improved transmission gain from the antenna.

2. Background Information

Inspecting and managing the air pressure of tires is important in conventional vehicles. Abnormal tire air pressure values often lead to accidents. Tire-state-monitoring systems are therefore well-known. In these tire-state-monitoring systems, a tire-information-acquiring device for detecting the air pressure within the tire of the wheel and for transmitting this information is provided to each of the wheels. The tire-state-monitoring systems are also provided with a monitoring device for acquiring the information about tire air pressure transmitted from the tire-information-acquiring device, monitoring the air pressure in the tires, and warning when the air pressure is abnormal (see, e.g., Japanese Patent No. 3962073).

The tire-information-acquiring device of the tire-state-monitoring system is positioned in an internal space formed between the tire and the wheel. The tire-information-acquiring device is configured so as to accommodate an air-pressure sensor, a transmitter, and the like in a casing. The air-pressure sensor is composed of a pressure-detecting element for detecting the air pressure within the tire, and the transmitter converts the detection results of the air-pressure sensor to an electrical signal and wirelessly transmits the signal to the monitoring device. A through-hole for guiding air in the internal space formed between the tire and the wheel to the internal air-pressure sensor is provided to the casing. The monitoring device is positioned near the driver's seat. The monitoring device receives the air-pressure information about the tires as transmitted from the tire-information-acquiring devices and produces a predetermined warning for the driver in cases where the air pressure in the tires is lower than a reference pressure that is set in advance.

SUMMARY

However, in the aforedescribed conventional information-acquiring device, a transmitting circuit or other electronic circuit and an antenna are accommodated within the casing, which has the minimum necessary internal space. Accommodating these components inside the casing therefore causes the transmission gain from the antenna to decrease.

It is an object of the present invention to provide an information-acquiring device in which decreases in the transmission gain of the antenna are reduced, even when the electronic circuit and the antenna are accommodated inside the casing.

There is proposed an information-acquiring device including a transmitter stored inside a casing permeable to radio waves. The transmitter has an electronic circuit having a sensor and a transmitting circuit, the sensor adapted for detecting predetermined physical information, and the transmitting circuit adapted for transmitting the physical information detected by the sensor; and a coil-shaped antenna for radiating a signal containing the physical information as a radio wave having a predetermined frequency, the antenna being connected to the transmitting circuit. A main body of the electronic circuit is positioned in a space other than a space present in the direction of a coil axis of the antenna.

According to the present invention, the main body of the electronic circuit is positioned in a space other than the space present in the direction of the coil axis of the antenna. The magnetic current that forms the magnetic field in the coil-shaped antenna, which is a magnetic-field antenna, is therefore not impeded, and radio waves can be efficiently radiated from the antenna.

According to the present invention, the magnetic current that forms the magnetic field in the coil-shaped antenna, which is a magnetic-field antenna, is not impeded. Radio waves can therefore be efficiently radiated from the antenna, and therefore decreases in the transmission gain of the antenna are reduced, even when the electronic circuit and the antenna are accommodated inside the casing.

DETAILED DESCRIPTION OF EMBODIMENTS

An embodiment of the present invention will be described below with reference to the drawings.

Figure 1:
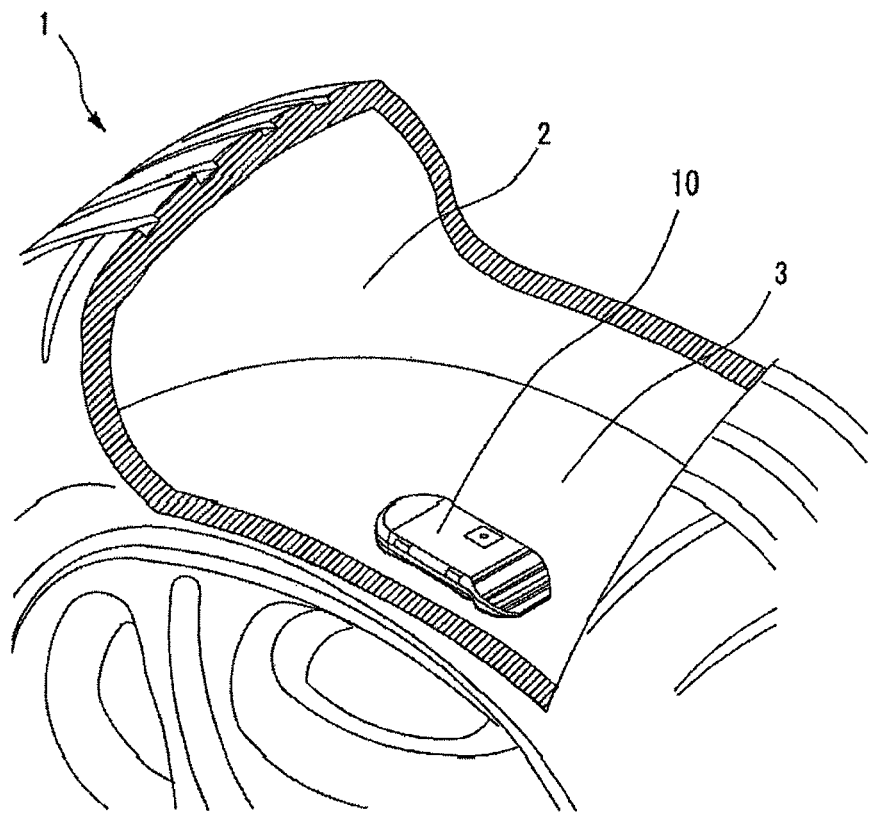
FIG. 1 shows a tire in which an information-acquiring device of a first embodiment of the present invention is mounted.
Figure 2:
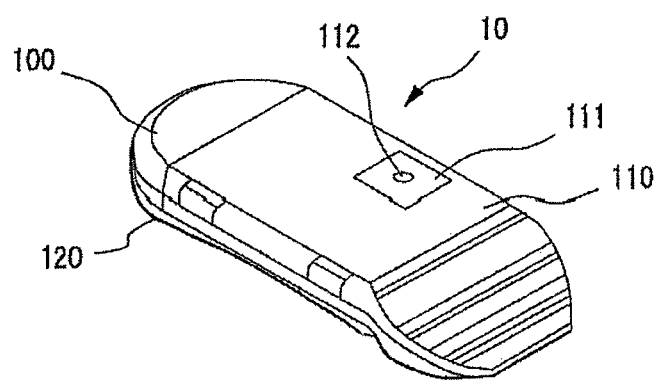
FIG. 2 is an external view showing the information-acquiring device of the first embodiment of the present invention.
Figure 3:
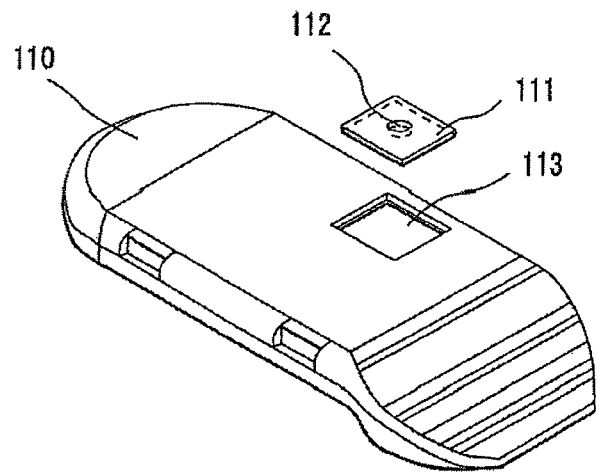
FIG. 3 is an exploded perspective view showing the information-acquiring device of the first embodiment of the present invention.
Figure 3:
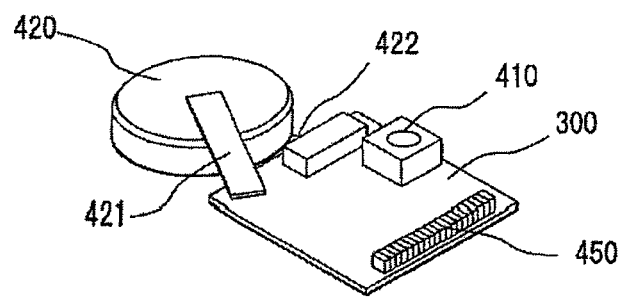
Figure 3:
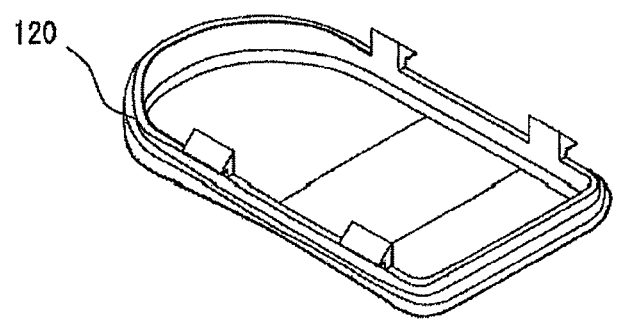
Figure 4:
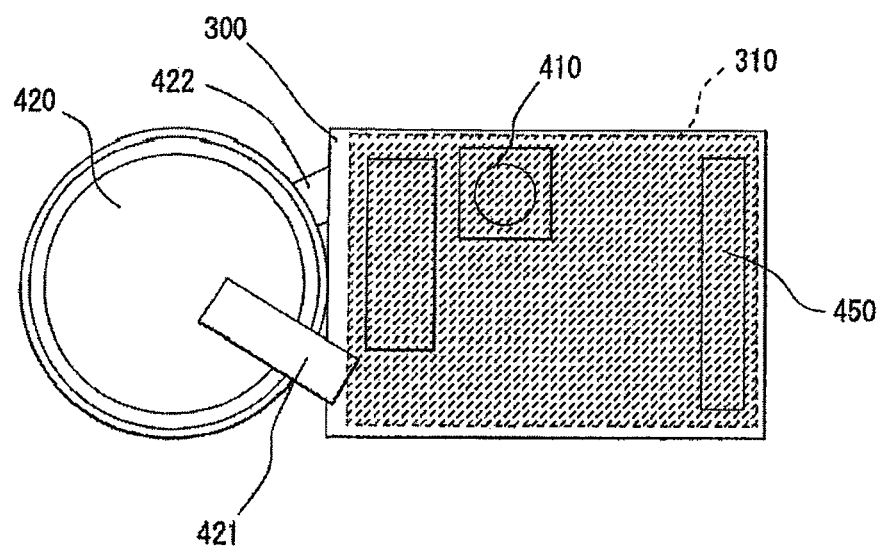
FIG. 4 is a plan view showing a printed wiring substrate of the first embodiment of the present invention.
Figure 5:
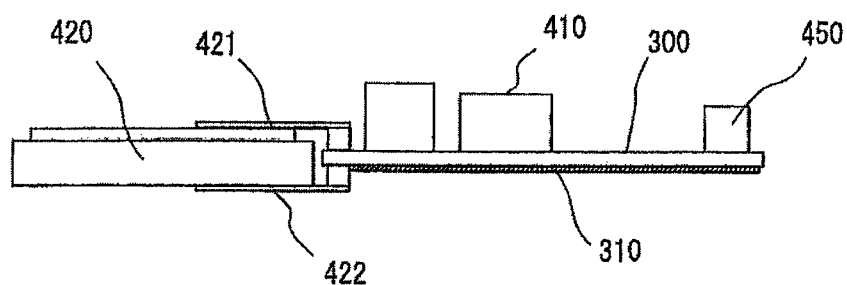
FIG. 5 is a lateral view showing the printed wiring substrate of the first embodiment of the present invention.
Figure 6:
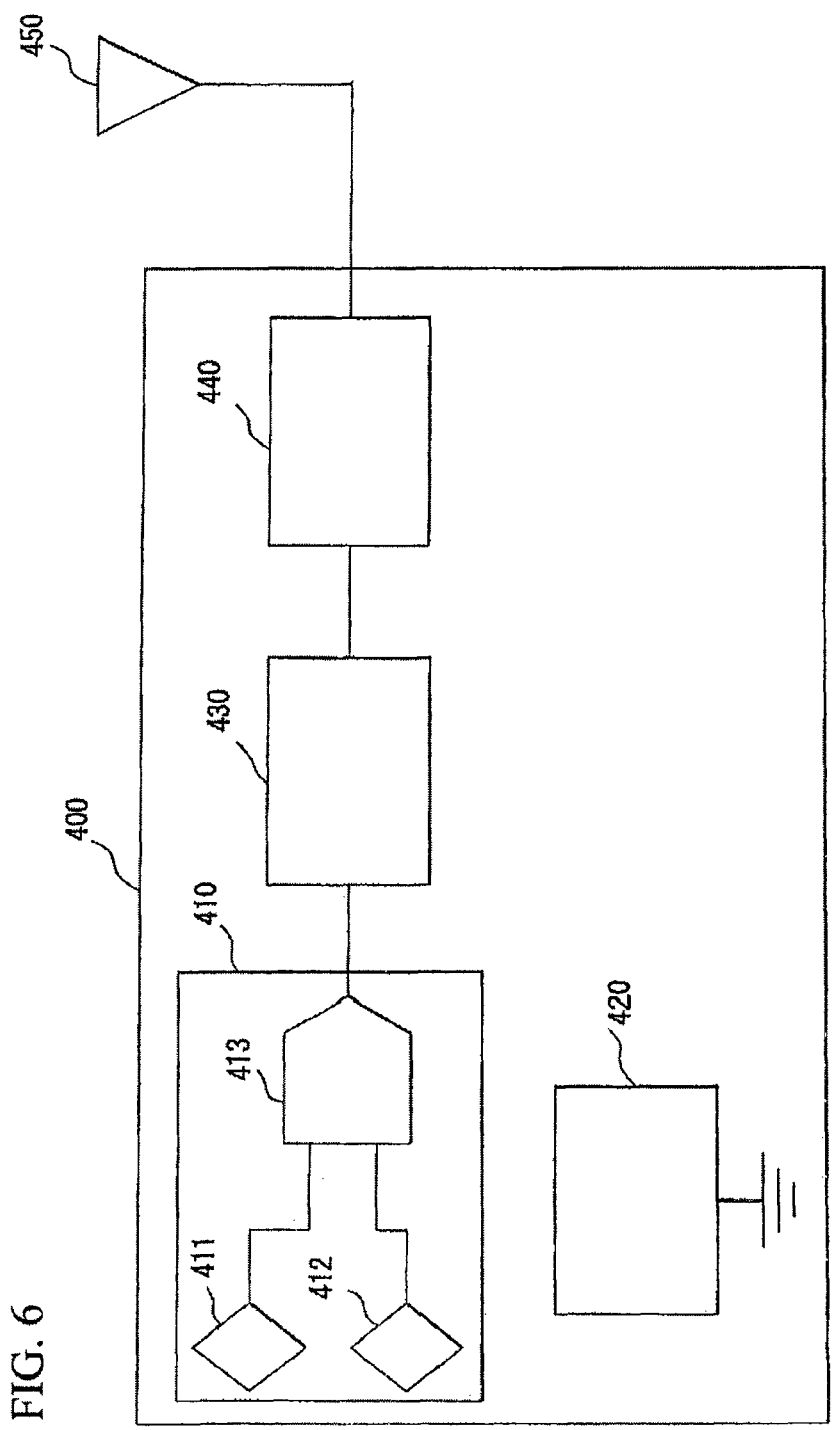
FIG. 6 is a block diagram showing electrical circuits of the information-acquiring device of the first embodiment of the present invention.

FIG.1 shows a tire in which an information-acquiring device of a first embodiment of the present invention is mounted. FIG. 2 is an external perspective view showing the information-acquiring device of the first embodiment of the present invention. FIG. 3 is an exploded perspective view showing the information-acquiring device of the first embodiment of the present invention. FIG. 4 is a plan view showing a printed wiring substrate of the first embodiment of the present invention. FIG. 5 is a lateral view showing the printed wiring substrate of the first embodiment of the present invention. FIG. 6 is a block diagram showing electrical circuits of the information-acquiring device of the first embodiment of the present invention.

An information-acquiring device 10 is affixed at a predetermined position on a rim 3 inside an air cavity 2 of a tire 1. A sensor part, which is provided to the interior of the information-acquiring device 10 and is provided with a pressure-detecting element and a temperature-detecting element (described below), is used to detect the pressure and temperature within the air cavity 2 of the tire 1 and to convert the detection results into digital values. The information-acquiring device 10 generates and transmits digital information that includes these digital values. Besides the digital values of the detection results, identification information unique to the information-acquiring device 10 is included in the digital information.

The information-acquiring device 10 is provided with a casing 100. A printed wiring substrate 300 and a battery 420 are accommodated within the casing 1.00. A detecting-and-transceiving circuit 400 shown in FIG. 6 is formed on the printed wiring substrate 300. Specifically, the detecting-and-transceiving circuit 400 is configured from a sensor part 410, a battery 420, a main control part 430, a transceiver part 440, and an antenna 450.

The casing 100 is configured from a casing body 120 and an upper cover 110 made from a synthetic resin that is permeable to radio waves. A square aperture part 113 is formed at a predetermined position on the upper cover 110. This position corresponds to the position of the sensor part 410. The aperture part 113 is covered by a lid 111 that has a through-hole 112.

The sensor part 410 is installed on the front surface of the printed wiring substrate 300 and is configured from an air-pressure-detecting element 411, a temperature-detecting element 412, and an analog-digital-converting circuit 413. The sensor part 410 uses the air-pressure-detecting element 411 and the temperature-detecting element 412 to detect the air pressure and temperature within the air cavity 2 of the tire 1, uses the analog-digital-converting circuit 413 to convert the detection results into digital values, and issues an output to the main control part 430.

The battery 420 is linked to the printed wiring substrate 300 by connecting conductors 421, 422 and supplies power to the detecting-and-transceiving circuit 400 formed on the printed wiring substrate 300. The connecting conductor 421 is connected to a positive electrode of the battery 420 and to the front surface of the printed wiring substrate 300, and the other connecting conductor 422 is connected to a negative electrode of the battery 420 and to the rear surface of the printed wiring substrate 300. The potential of the negative electrode of the battery 420 is a reference potential (=0 V) in the detecting-and-transceiving circuit 400.

The main control part 430 is configured from a common CPU, a memory, and the like. The main control part 430 receives the detection results of the sensor part 410 as digital values, generates digital information that includes the digital values, and issues an output to the transceiver part 440. Besides the digital values, identification information, e.g., the manufacturer's serial number, that is unique to the information-acquiring device 10 is included in the digital information.

The transceiver part 440 uses radio waves having a predetermined frequency, e.g., 315 MHz, to transmit the digital information inputted from the main control part 430.

The antenna 450 is a coil-shaped helical antenna having a resonant frequency set to the transmission frequency of the transceiver part 440 and is mounted on the front surface of the printed wiring substrate 300. The antenna 450 is mounted on the front surface of the printed wiring substrate 300 so that the axis of the helical antenna is parallel to the front surface of the printed wiring substrate 300 and is extended in the widthwise direction of the printed wiring substrate 300.

The printed wiring substrate 300 is composed of a laminated multilayer ceramic substrate. A conductor pattern 310 is provided to substantially the entire rear surface of the printed wiring substrate 300. The conductor pattern 310 is connected to the negative electrode of the battery 420, and the potential of the conductor pattern 310 is set to the reference potential (=0V) of the detecting-and-transceiving circuit 400. The printed wiring substrate 300 is affixed to the casing body 120 so that the rear surface of the printed wiring substrate 300, i.e., the conductor pattern 310, faces the bottom surface of the casing body 120. The thickness of the copper foil that forms the conductor pattern 310 is generally, e.g., 12, 18, 35, or 70 microns (μm), but in consideration of durability (resistance to delamination), the thickness of the conductor pattern 310 is preferably 18 μm or more.

Figure 7:
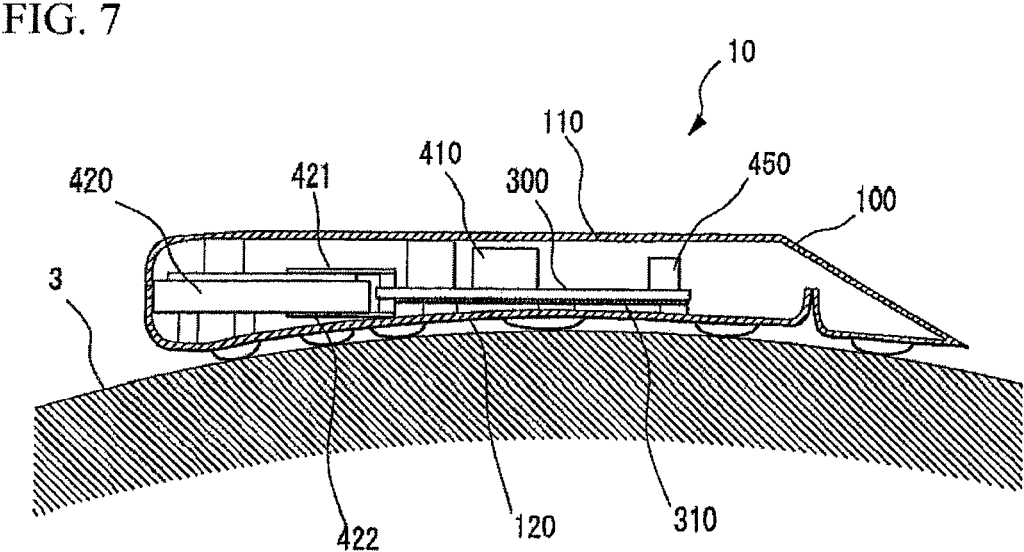
FIG. 7 is a lateral cross-sectional view showing a state in which the information-acquiring device of the first embodiment of the present invention is mounted on a rim.

A lateral cross-sectional view of the information-acquiring device 10 having the aforedescribed configuration mounted on the rim 3 is shown in FIG. 7. The casing 100 is affixed to the front surface of the rim 3 so that the bottom surface of the casing body 120 faces the front surface of the rim 3 when the information-acquiring device 10 is mounted on the rim 3, as shown in FIG. 7. The casing 100 is thus affixed to the rim 3, whereby the conductor pattern 310, which is set to the reference potential, is positioned between the antenna 450, which is mounted on the front surface of the printed wiring substrate 300, and the front surface of the rim 3. The conductor pattern (flat conductor) 310 therefore acts as a boundary surface between the antenna 450 and the rim 3 when the information-acquiring device 10 is mounted on the rim 3, and the effect on the antenna 450 of the metal that constitutes the rim 3 can therefore be more significantly reduced than in the past. The distance between the antenna 450 and the conductor pattern 310 is kept constant by the thickness of the dielectric material of the printed wiring substrate 300, and therefore the antenna characteristics can be maintained in a favorable state regardless of variations in the shape of the rim 3.

There is no need to make the antenna 450 having optimal characteristics for each shape of the rim 3. The same antenna 450 can be used regardless of the shape of the rim 3, and therefore the manufacturing cost for a single unit of the information-acquiring device 10 can be made dramatically less than with the prior art, and mass production of the information-acquiring device 10 can be facilitated.

The antenna 450 is mounted on the front surface of the printed wiring substrate 300 so that a coil axis x of the antenna 450 is parallel to the front surface of the printed wiring substrate 300 and extends in the widthwise direction of the printed wiring substrate 300. The detecting-and-transceiving circuit 400 is not positioned in a space inside the casing 100 in the axial direction of the antenna 450. The magnetic current that forms the magnetic field in the coil-shaped antenna 450, which is a magnetic-field antenna, is therefore not impeded, and radio waves can therefore be efficiently radiated from the antenna 450. Decreases in the transmission gain of the antenna 450 can therefore be reduced even when the electronic circuit and the antenna 450 are accommodated inside the casing 100.

Figure 8:
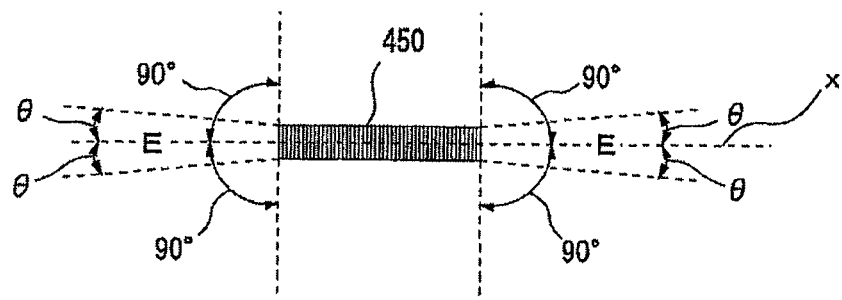
FIG. 8 is a plan view of an antenna that shows a conductor-free space of the first embodiment of the present invention.
Figure 9:
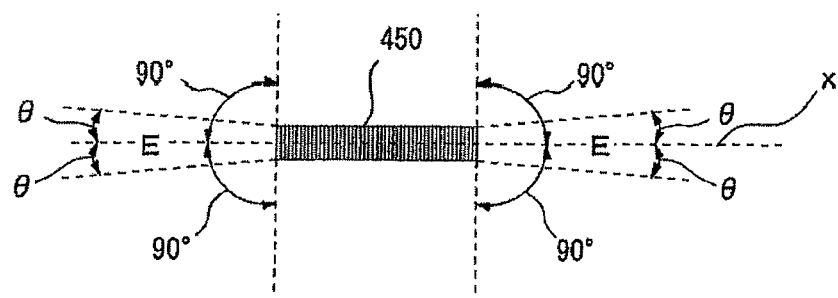
FIG. 9 is a front view of the antenna that shows the conductor-free space of the first embodiment of the present invention.

As shown in the plan view of the antenna 450 in FIG. 8 and the front view of the antenna 450 in FIG. 9, the electronic components, conductors, and the like that form the detecting-and-transceiving circuit 400 are preferably positioned in a space inside the casing 100 other than a space E that is enclosed by an imaginary surface that forms a predetermined angle θ with respect to the coil axis x toward the outside from a position on the edge of the aperture surface of the end part of the antenna 450 in the direction of the coil axis x. The angle θ is, e.g., 5° or more and is preferably 90°. Minute electronic components and conductors may be positioned within the space E if doing so does not dramatically change the magnetic current of the antenna 450.

A second embodiment of the present invention will be described next.

Figure 10:
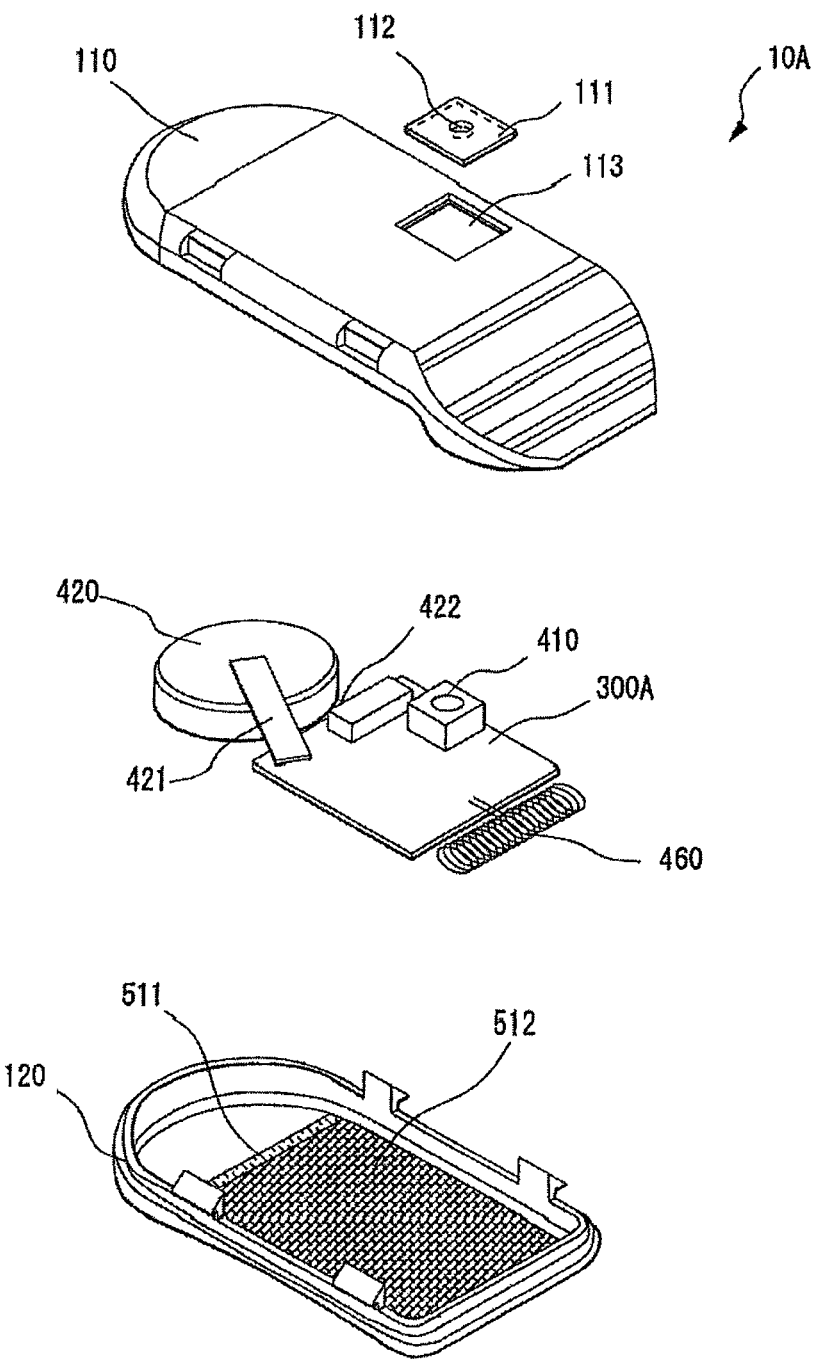
FIG. 10 is an exploded perspective view showing an information-acquiring device of a second embodiment of the present invention.
Figure 11:
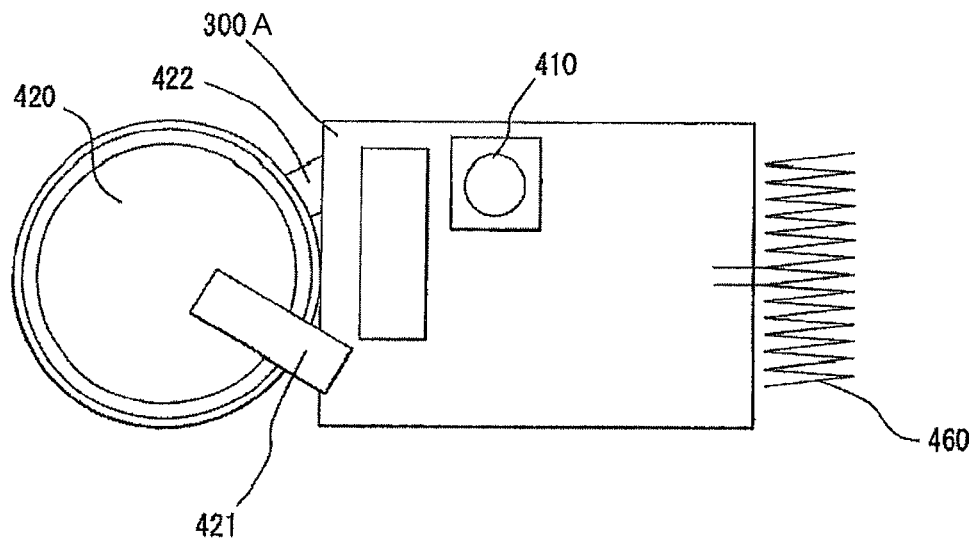
FIG. 11 is a plan view showing a printed wiring substrate of the second embodiment of the present invention.
Figure 12:
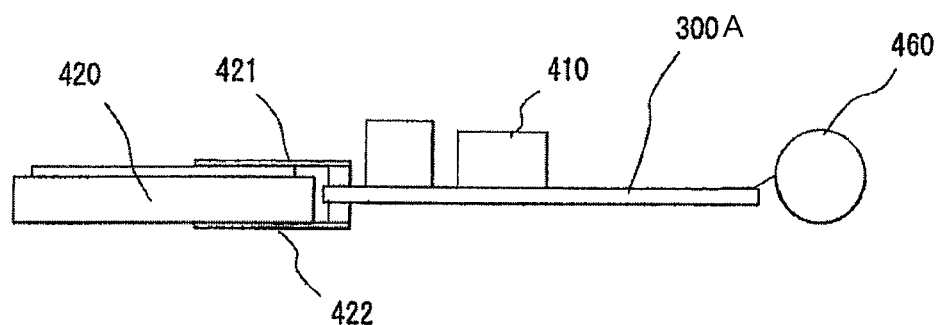
FIG. 12 is a lateral view showing the printed wiring substrate of the second embodiment of the present invention.
Figure 13:
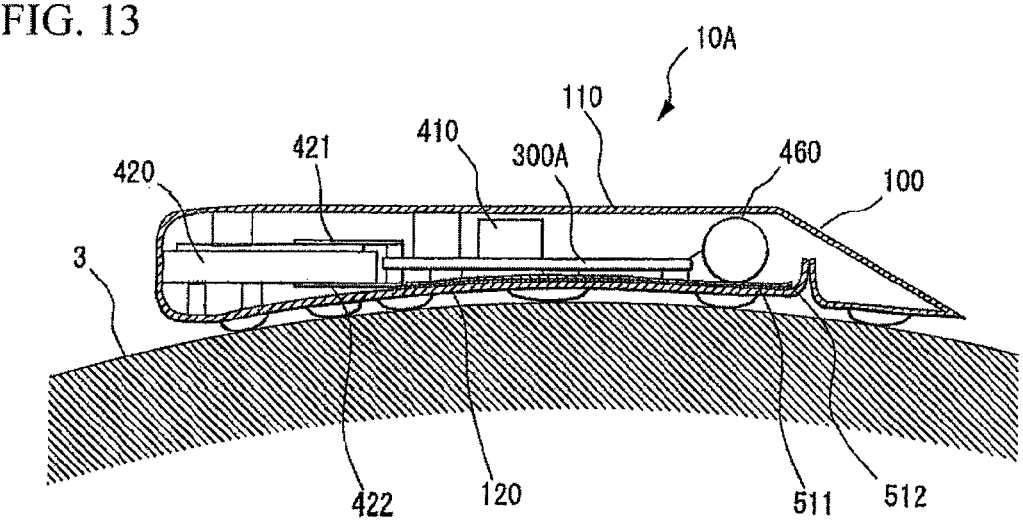
FIG. 13 is a lateral cross-sectional view showing a state in which the information-acquiring device of the second embodiment of the present invention is mounted on the rim.

FIG. 10 is an exploded perspective view showing an information-acquiring device 10A of the second embodiment of the present invention. FIG. 11 is a plan view showing a printed wiring substrate 300A of the second embodiment of the present invention. FIG. 12 is a lateral view showing the printed wiring substrate 300A of the second embodiment of the present invention. FIG. 13 is a lateral cross-sectional view showing a state in which the information-acquiring device 10A of the second embodiment of the present invention is mounted on the rim 3. Those parts of the configuration in FIGS. 10 through 13 that are the same as those in the previously described first embodiment will be shown using the same reference numerals, and descriptions thereof will be omitted. The differences between the second embodiment and the first embodiment are that a coil-shaped antenna 460 is provided instead of the antenna 450 of the first embodiment, the printed wiring substrate 300A is used instead of the printed wiring substrate 300, and a conducting film 511 and an insulating film 512 are provided to the bottom surface inside the casing body 120.

The antenna 460 forms a spring-coil shape having a resonant frequency set to 315 MHz. A feeding point is provided to the center part of the antenna 460. The feeding point is connected to the transceiver part 440 formed on the printed wiring substrate 300A. The antenna 460 is formed having a larger diameter than the antenna 450, and therefore the antenna 460 is provided to the outside of the edge part of the printed wiring substrate 300A so that the coil axis of the antenna 460 is parallel to the side and front surface of the printed wiring substrate 300A nearby and extends in the widthwise direction of the printed wiring substrate 300A.

The printed wiring substrate 300A lacks the conductor pattern 310 that is provided to the rear surface of the printed wiring substrate 300 of the first embodiment, but other than lacking the conductor pattern 310, the printed circuit board 300A is the same as the printed wiring substrate 300.

The conducting film 511 is provided to the bottom surface inside the casing body 120, and the electrically insulating film 512 is provided to the front surface of the conducting film 511, as shown in the drawings. The insulating film 512 prevents conductive connections of the conducting film 511 with the printed wiring substrate 300A and the antenna 460. The conducting film 511 is conductively connected to the negative electrode of the battery 420, and the potential of the conducting film 511 is set to the reference potential (=0 V) of the detecting-and-transceiving circuit 400. The thickness of the conducting film 511 is preferably 18 μm or more, for the same reasons as described previously.

The casing 100 is affixed to the front surface of the rim 3 so that the bottom surface of the casing body 120 faces the front surface of the rim 3 when the information-acquiring device 10A having the aforedescribed configuration is mounted on the rim 3, as shown in FIG. 13. The casing 100 is thus affixed to the rim 3, whereby the conducting film 511, which is set to the reference potential, is positioned between the antenna 460 and the front surface of the rim 3. The conducting film (flat conductor) 511 therefore acts as a boundary surface between the antenna 460 and the rim 3 when the information-acquiring device 10A is mounted on the rim 3, and the effect on the antenna 460 of the metal that constitutes the rim 3 can therefore be more significantly reduced than in the past. The distance between the antenna 460 and the conducting film 511 is kept constant by the printed wiring substrate 300A being affixed to a predetermined position on the casing body 120, and therefore the antenna characteristics can be maintained in a favorable state regardless of variations in the shape of the rim 3.

There is no need to make the antenna 460 having optimal characteristics for each shape of the rim 3. The same antenna 460 can be used regardless of the shape of the rim 3, and therefore the manufacturing cost for a single unit of the information-acquiring device 10A can be made dramatically less than with the prior art, and mass production of the information-acquiring device 10A can be facilitated.

The antenna 460 is mounted outside the edge part of the printed wiring substrate 300A so that the coil axis x of the antenna 460 is parallel to the front surface of the printed wiring substrate 300A and extends in the widthwise direction of the printed wiring substrate 300A: The detecting-and-transceiving circuit 400 and conductors are not positioned in a space inside the casing 100 in the axial direction of the antenna 460. The magnetic current that forms the magnetic field in the coil-shaped antenna 460, which is a magnetic-field antenna, is therefore not impeded, and radio waves can therefore be efficiently radiated from the antenna 460. Decreases in the transmission gain of the antenna 460 can therefore be reduced even when the electronic circuit and the antenna 460 are accommodated inside the casing 100.

Figure 14:
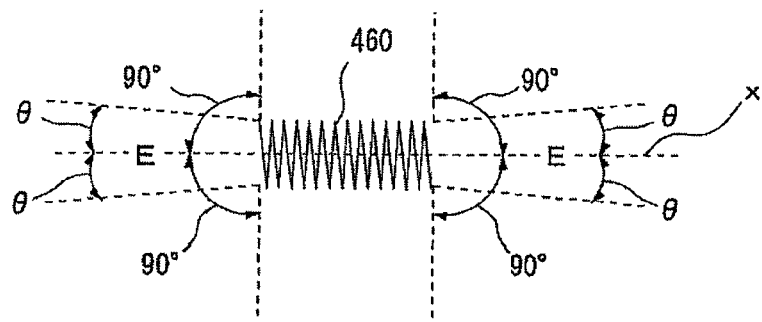
FIG. 14 is a plan view of an antenna that shows the conductor-free space of the second embodiment of the present invention.
Figure 15:
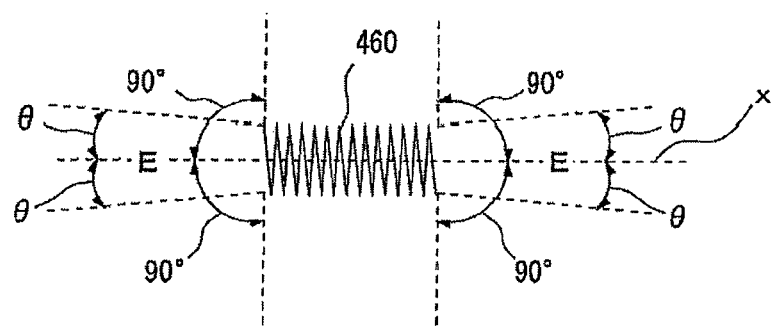
FIG. 15 is a front view of the antenna that shows the conductor-free space of the second embodiment of the present invention.

As shown in the plan view of the antenna 460 showing the conductor-free space in FIG. 14 and the front view of the antenna 460 showing the conductor-free space in FIG. 15, the electronic components, conductors, and the like that form the electronic circuit are preferably positioned in a space inside the casing 100 other than a space that is enclosed by an imaginary surface that forms a predetermined angle θ with respect to the coil axis x toward the outside from a position on the edge of the aperture surface of the end part of the antenna 460 in the direction of the coil axis x. The angle θ is, e.g., 5° or more and is preferably 90°. Minute electronic components and conductors may be positioned within the space E if doing so does not dramatically change the magnetic current of the antenna 460.

A third embodiment of the present invention will be described next.

Figure 16:
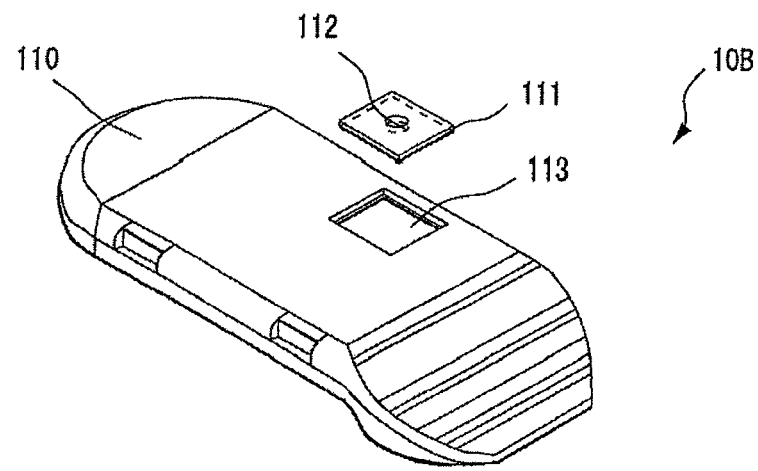
FIG. 16 is an exploded perspective view showing an information-acquiring device of a third embodiment of the present invention.
Figure 16:
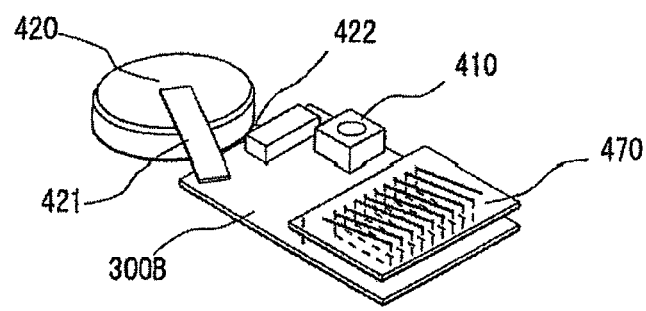
Figure 16:
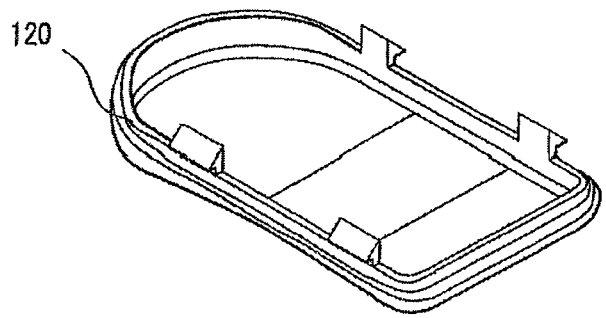
Figure 17:
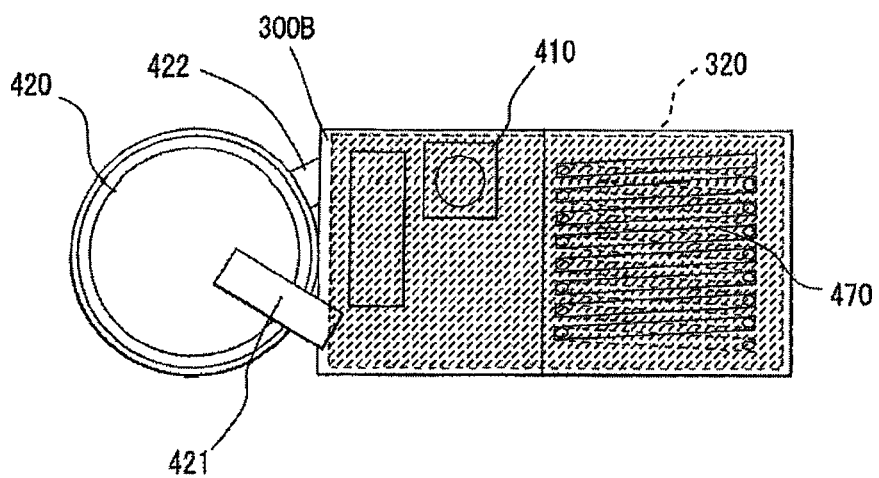
FIG. 17 is a plan view showing a printed wiring substrate of the third embodiment of the present invention.
Figure 18:
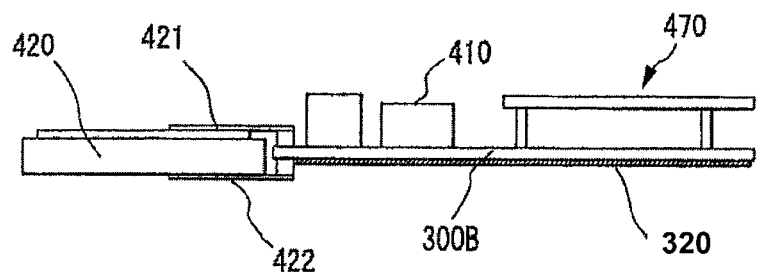
FIG. 18 is a lateral view showing the printed wiring substrate of the third embodiment of the present invention.
Figure 19:
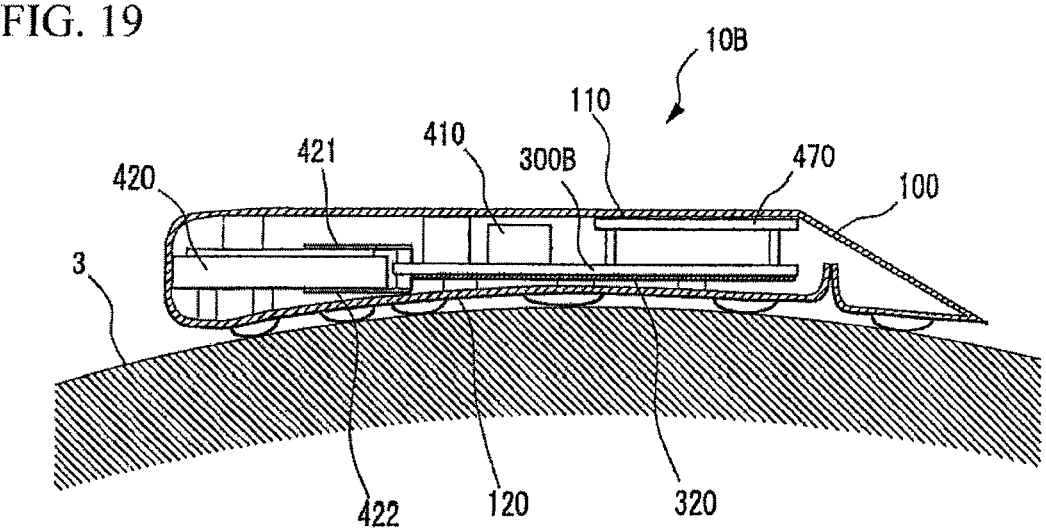
FIG. 19 is a lateral cross-sectional view showing a state in which the information-acquiring device of the third embodiment of the present invention is mounted on the rim.

FIG. 16 is an exploded perspective view showing an information-acquiring device 10B of the third embodiment of the present invention. FIG. 17 is a plan view showing a printed wiring substrate 300B of the third embodiment of the present invention. FIG. 18 is a lateral view showing the printed wiring substrate 300B of the third embodiment of the present invention. FIG. 19 is a lateral cross-sectional view showing a state in which the information-acquiring device 10B of the third embodiment of the present invention is mounted on the rim 3. Those parts of the configuration in FIGS. 16 through 19 that are the same as those in the previously described first embodiment will be shown using the same reference numerals, and descriptions thereof will be omitted. The differences between the third embodiment and the first embodiment are that an antenna 470 is provided instead of the antenna 450 of the first embodiment, and the printed wiring substrate 300B is used instead of the printed wiring substrate 300.

The printed wiring substrate 300B has a somewhat larger shape than the printed wiring substrate 300 of the first embodiment, and the antenna 470 is formed in the significantly expanded portion. A conductor pattern 320 is provided to substantially the entire rear surface of the printed wiring substrate 300B like the first embodiment. The conductor pattern 320 is connected to the negative electrode of the battery 420, and the potential of the conductor pattern 320 is set to the reference potential (=0 V) of the detecting-and-transceiving circuit 400. The thickness of the conductor pattern 320 is preferably 18 μm or more, for the same reasons as described previously.

The antenna 470 is configured from a printed wiring pattern (shortened to "wiring pattern" below), which is formed on the printed wiring substrate 300B, and a battery 420, which is linked to the printed wiring substrate 300B by a plurality of connecting conductors 421, 422.

The casing 100 is affixed to the front surface of the rim 3 so that the bottom surface of the casing body 120 faces the front surface of the rim 3 when the information-acquiring device 10B having the aforedescribed configuration is mounted on the rim 3, as shown in FIG. 19. The casing 100 is thus affixed to the rim 3, whereby the conductor pattern 320, which is set to the reference potential, is positioned between the antenna 470 and the front surface of the rim 3. The conductor pattern (flat conductor) 320 therefore acts as a boundary surface between the antenna 470 and the rim 3 when the information-acquiring device 10B is mounted on the rim 3, and the effect on the antenna 470 of the metal that constitutes the rim 3 can therefore be more significantly reduced than in the past.

There is no need to make the antenna 470 having optimal characteristics for each shape of the rim 3. The same antenna 470 can be used regardless of the shape of the rim 3, and therefore the manufacturing cost for a single unit of the information-acquiring device 10B can be made dramatically less than with the prior art, and mass production of the information-acquiring device 10B can be facilitated.

The antenna 470 is formed on the printed wiring substrate 300B so that the coil axis x of the antenna 470 is parallel to the front surface of the printed wiring substrate 300B and extends in the widthwise direction of the printed wiring substrate 300B. The detecting-and-transceiving circuit 400 and conductors are not positioned in a space inside the casing 100 in the axial direction of the antenna 470. The magnetic current that forms the magnetic field in the coil-shaped antenna 470, which is a magnetic-field antenna, is therefore not impeded, and radio waves can therefore be efficiently radiated from the antenna 470. Decreases in the transmission gain of the antenna 470 can therefore be reduced even when the electronic circuit and the antenna 470 are accommodated inside the casing 100.

Figure 20:
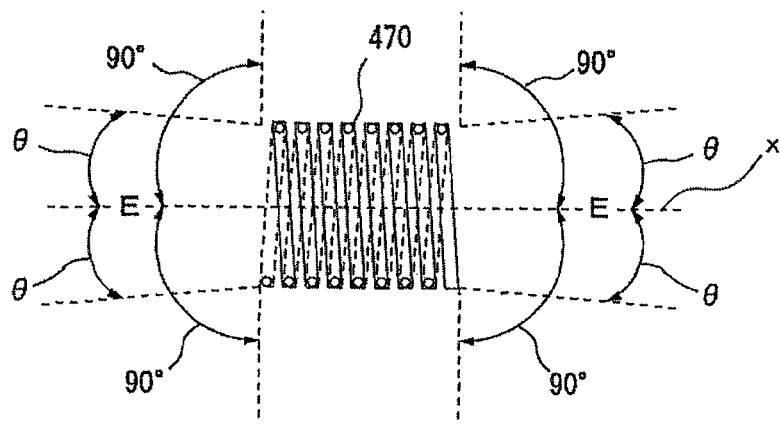
FIG. 20 is a plan view of an antenna that shows the conductor-free space of the third embodiment of the present invention.
Figure 21:
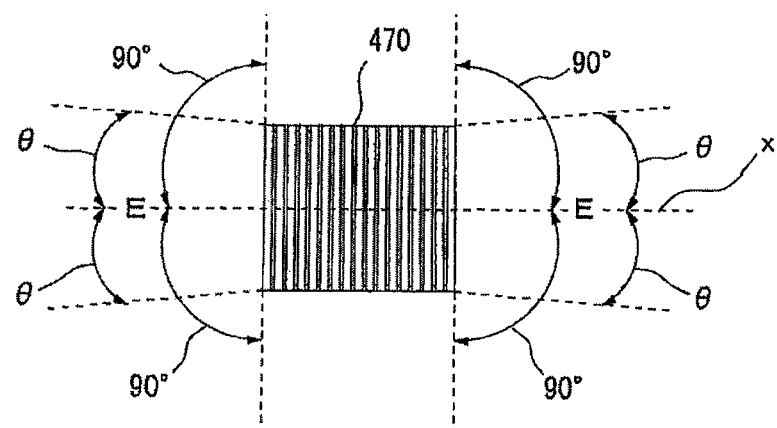
FIG. 21 is a front view of the antenna that shows the conductor-free space of the third embodiment of the present invention.

As shown in the plan view of the antenna 470 showing the conductor-free space in FIG. 20 and the front view of the antenna 470 showing the conductor-free space in FIG. 21, the electronic components, conductors, and the like that form the electronic circuit are preferably positioned in a space inside the casing 100 other than a space that is enclosed by an imaginary surface that forms a predetermined angle θ with respect to the coil axis x toward the outside from a position on the edge of the aperture surface of the end part of the antenna 470 in the direction of the coil axis x. The angle θ is, e.g., 5° or more and is preferably 90°. Minute electronic components and conductors may be positioned within the space E if doing so does not dramatically change the magnetic current of the antenna 470.

A fourth embodiment of the present invention will be described next.

Figure 22:
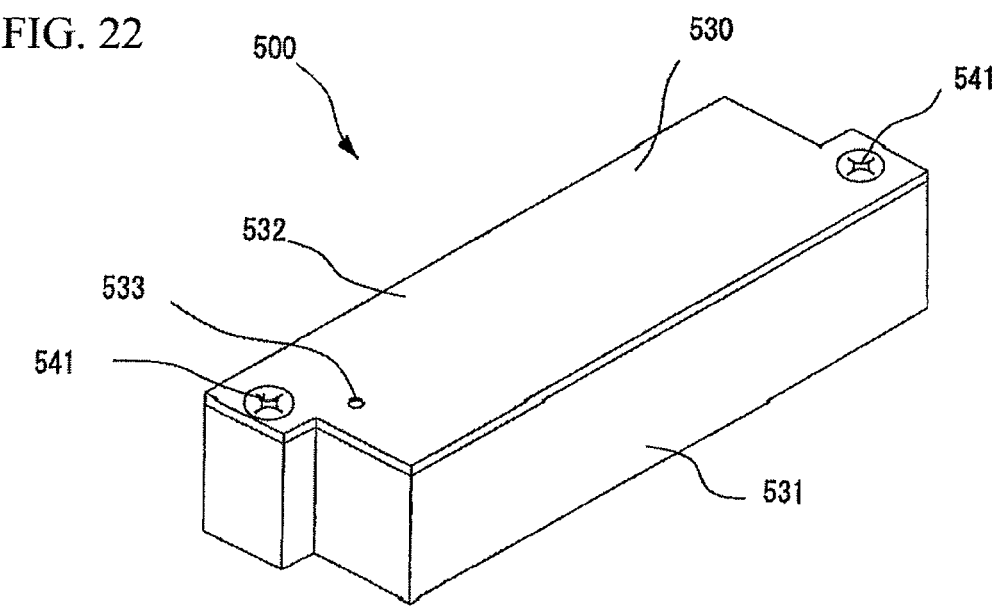
FIG. 22 is an exploded perspective view showing an information-acquiring device of a fourth embodiment of the present invention.
Figure 23:
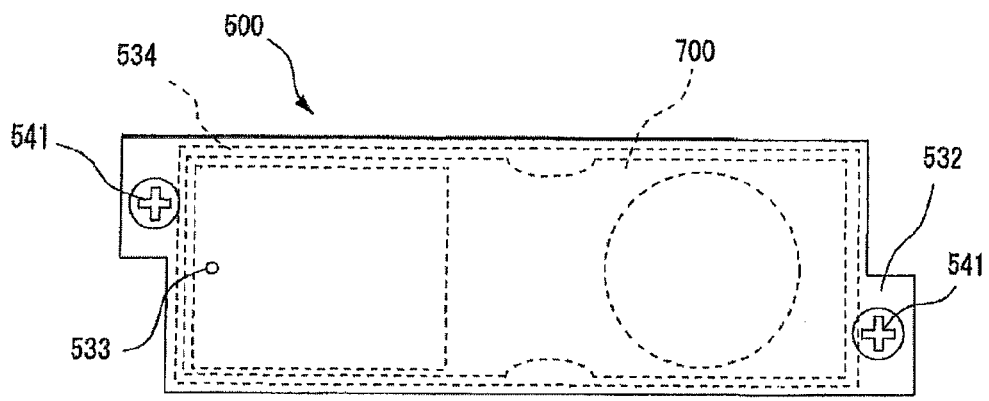
FIG. 23 is a plan view showing the information-acquiring device of the fourth embodiment of the present invention.
Figure 24:
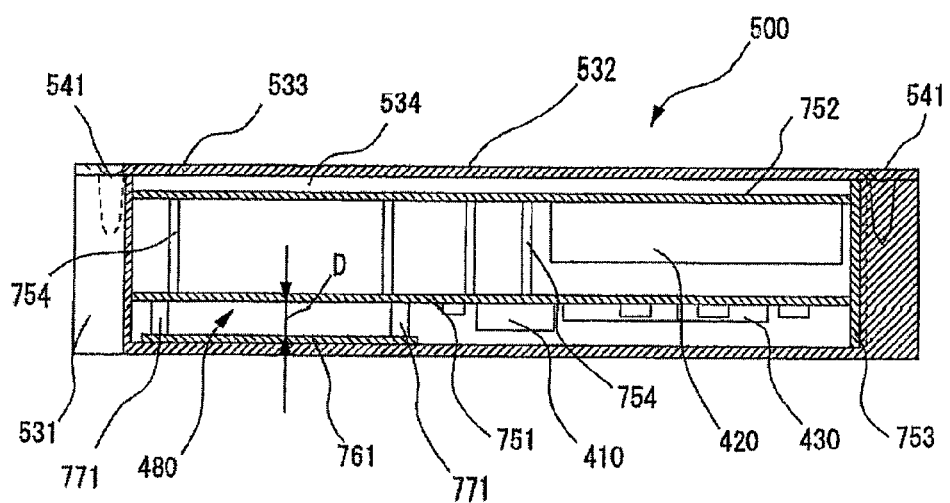
FIG. 24 is a lateral cross-sectional view showing the information-acquiring device of the fourth embodiment of the present invention.
Figure 25:
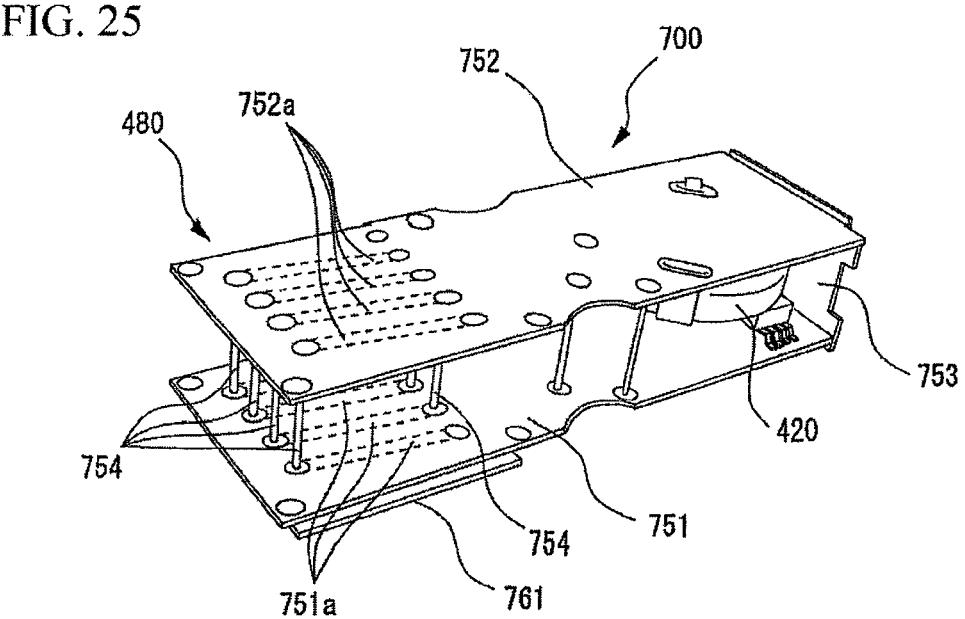
FIG. 25 is an external perspective view showing a main device body of the fourth embodiment of the present invention.
Figure 26:
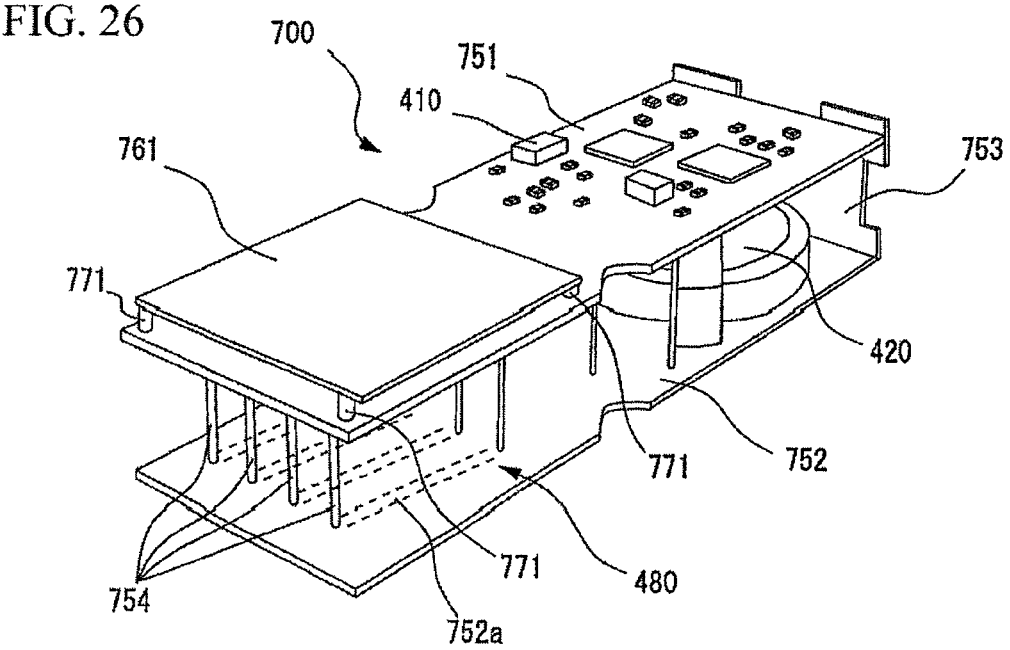
FIG. 26 is an external perspective view showing the main device body of the fourth embodiment of the present invention.
Figure 27:
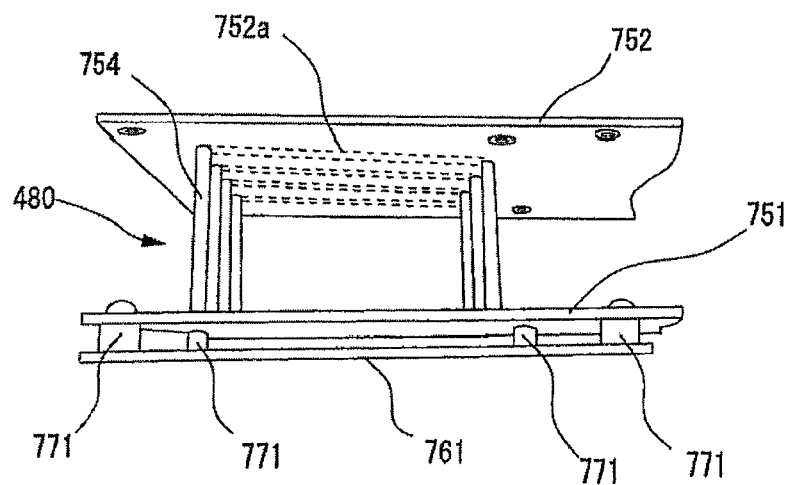
FIG. 27 is an external perspective view showing the primary components of the main device body of the fourth embodiment of the present invention.

FIG. 22 is an exploded perspective view showing an information-acquiring device of the fourth embodiment of the present invention. FIG. 23 is a plan view showing the information-acquiring device of the fourth embodiment of the present invention. FIG. 24 is a lateral cross-sectional view showing the information-acquiring device of the fourth embodiment of the present invention. FIGS. 25 and 26 are external perspective views showing a main device body of the fourth embodiment of the present invention. FIG. 27 is an external perspective view showing the primary components of the main device body of the fourth embodiment of the present invention.

In the drawings, 500 is an information-acquiring device, which, like the aforedescribed information-acquiring devices 10, 10A, 10B, is affixed at a predetermined position on the rim 3 inside the air cavity 2 of the tire 1. A sensor part, which is provided to the interior of the information-acquiring device 500 and is provided with a pressure-detecting element and a temperature-detecting element (described below), is used to detect the pressure and temperature within the air cavity 2 of the tire 1 and to convert the detection results into digital values. The information-acquiring device 500 generates and transmits digital information that includes these digital values. Besides the digital values of the detection results, identification information unique to the information-acquiring device 500 is included in the digital information. The information-acquiring device 500 is provided with a casing 530, and a main device body 700 is accommodated within the casing 530.

As shown in FIGS. 22 through 24, the casing 530 of the information-acquiring device 500 has a substantially cuboid shape, has protruding parts on both ends in the longitudinal direction for screwing tight, and is configured from a casing body 531 and a lid 532. As shown in FIG. 24, an accommodation space 534 for accommodating the main device body 700 is formed inside the casing body 531. The lid 532 is affixed to the casing body 531 using screws 541, whereby an aperture of the accommodation space 534 is closed. A through-hole 533 is formed in the lid 532, and air flows through the through-hole 533 from the outside to the accommodation space 534 even when the lid 532 is affixed to the casing body 531.

As shown in FIGS. 25 through 27, in the main device body 700, two printed wiring substrates 751, 752 that form a substantially rectangular shape are positioned in parallel at a predetermined interval and are affixed to each other by column-shaped connecting conductors 754, a third printed wiring substrate 753 for linking, and other components that constitute an antenna 480. The coil-shaped antenna 480, which has a central axis extending in the widthwise direction of first and second printed wiring substrates 751, 752, is formed on the other end part of the main device body 700 in the longitudinal direction. Electronic components that constitute an electronic circuit, including the sensor part 410, the battery 420, and the like are installed toward one end. The linking printed wiring substrate 753 is soldered to both of the printed wiring substrates 751, 752.

The space between the first printed wiring substrate 751 and the second printed wiring substrate 752 is such that one printed wiring substrate is affixed at a predetermined interval from the other printed wiring substrate. The first and second printed wiring substrates are linked by the plurality of the column-shaped connecting conductors 754 for electrically connecting the printed wiring of one printed wiring substrate to the printed wiring of the other printed wiring substrate.

The detecting-and-transceiving circuit 400 shown in FIG. 6 is formed on the main device body 700. Specifically, the detecting-and-transceiving circuit 400 is configured from the sensor part 410, the battery 420, the main control part 430, the transceiver part 440, and the antenna 480, as described above.

The sensor part 410 is mounted on the front surface of the main body 700 and is configured from the air-pressure-detecting element 411, the temperature-detecting element 412, and the analog-digital-converting circuit 413. The sensor part 410, e.g., uses the air-pressure-detecting element 411 and the temperature-detecting element 412 to detect the air pressure and temperature within the air cavity of a pneumatic fender, uses the analog-digital-converting circuit 413 to convert the detection results into digital values, and issues an output to the main control part 430.

The battery 420 is linked to the main device body 700 and supplies power to the detecting-and-transceiving circuit 400 that is formed on the main device body 700.

The main control part 430 is configured from a common CPU, a memory, and the like. The main control part 430 receives the detection results of the sensor part 410 as digital values, generates digital information that includes the digital values, issues an output to the transceiver part 440, and transmits radio waves from the transceiver part 440 through the antenna 480.

The transceiver part 440 switches between transmitting and receiving on the basis of commands from the main control part 430. During transmission, the digital information inputted from the main control part 430 is transmitted from the antenna 480 using a predetermined frequency, e.g., radio waves of 315 MHz. During reception, a digital signal is detected from received 315-MHz radio waves received through the antenna 480, and digital information is extracted from the detected digital signal and outputted to the main control part 430. The transmission and reception frequencies of the transceiver part 440 are set to the same frequency.

The antenna 480 is coil-shaped and has a resonant frequency set to the transceiving frequency of the transceiver part 440. The antenna 480 is formed from the column-shaped connecting conductors 754 that establish an electrical connection between a printed wiring 751a provided to the first printed wiring substrate 751 and a printed wiring 752a provided to the second printed wiring substrate 752, as well as between a printed wiring of the first printed wiring substrate 751 and a printed wiring of the second printed wiring substrate 752; and that fix the printed wiring substrates 751, 752 together.

Figure 28:
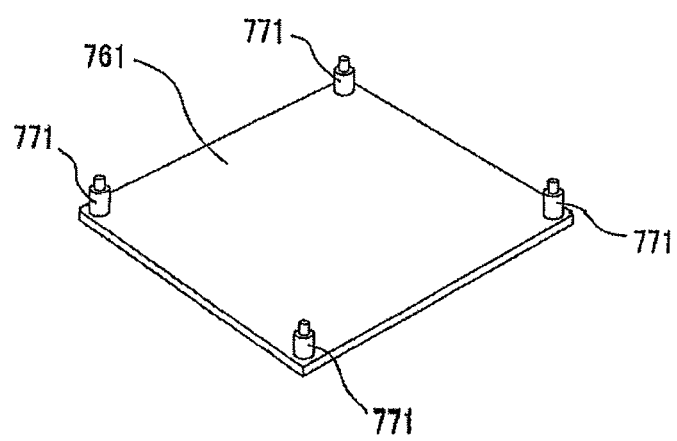
FIG. 28 is an external perspective view showing a flat conducting plate and a holding member of the fourth embodiment of the present invention.
Figure 29:
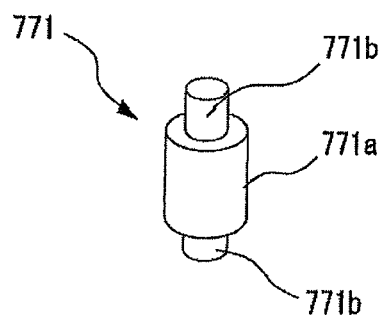
FIG. 29 is an external perspective view showing the holding member in the fourth embodiment of the present invention.

A flat conducting plate 761 that forms a rectangular shape on the external surface on the other end part of the first printed wiring substrate 751 is affixed using four holding members 771. The flat conducting plate 761 is provided to the position of the antenna 480 so as to be parallel to the printed wiring substrate 751 that is positioned toward the bottom surface of the casing body 531 when the main device body 700 is accommodated in the casing 530. The flat conducting plate 761 is affixed by the-holding members 771 so as to maintain a predetermined interval from the first printed wiring substrate 751. The flat conducting plate 761 is electrically connected to a predetermined conductor pattern (the conductor pattern connected to the negative electrode of the battery 420) of the first printed wiring substrate 751 and is set to the reference potential. The holding members 771 are affixed to the four corners of the flat conducting plate 761, as shown in FIG. 28. The holding members 771 are provided with cylindrical protruding parts 771b on both ends of a cylindrical main body 771a, as shown in FIG. 29. The protruding parts 771b have a smaller diameter than the main body 771a.

The casing 530 is affixed to the front surface of the rim 3 so that the flat conducting plate 761 faces the front surface of the rim 3 when the information-acquiring device 500 having the aforedescribed configuration is mounted on the rim 3. The casing 530 is thus affixed to the rim 3, whereby the flat conducting plate 761, which is set to the reference potential, is positioned between the antenna 480 and the front surface of the rim 3. The flat conducting plate 761 therefore acts as a boundary surface between the antenna 480 and the rim 3 when the information-acquiring device 500 is mounted on the rim 3, and the effect on the antenna 480 of the metal that constitutes the rim 3 can therefore be more significantly reduced than in the past.

There is no need to make the antenna 480 having optimal characteristics for each shape of the rim 3. The same antenna 480 can be used regardless of the shape of the rim 3, and therefore the manufacturing cost for a single unit of the information-acquiring device 500 can be made dramatically less than with the prior art, and mass production of the information-acquiring device 500 can be facilitated.

The antenna 480 is formed on the printed wiring substrates 751, 752 so that the coil axis x of the antenna 480 is parallel to the front surface of the printed wiring substrates 751, 752 and extends in the widthwise direction of the printed wiring substrates 751, 752. The detecting-and-transceiving circuit 400 and conductors are not positioned in a space inside the casing 530 in the axial direction of the antenna 480. The magnetic current that forms the magnetic field in the coil-shaped antenna 480, which is a magnetic-field antenna, is therefore not impeded, and radio waves can therefore be efficiently radiated from the antenna 480. Decreases in the transmission gain of the antenna 480 can therefore be reduced even when the electronic circuit and the antenna 480 are accommodated inside the casing 530.

Figure 30:
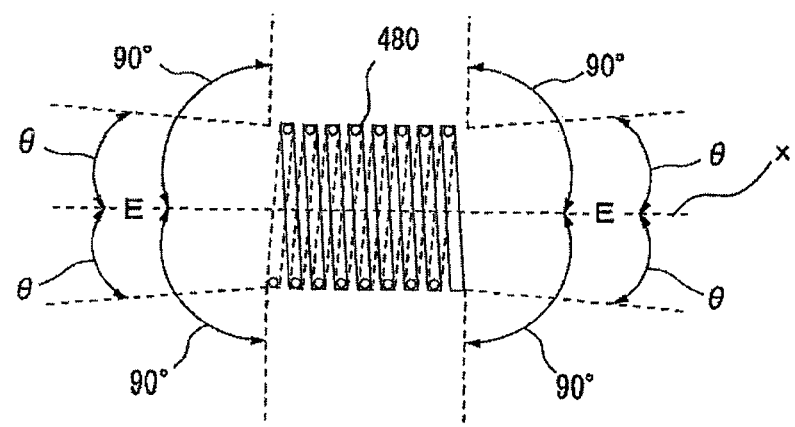
FIG. 30 is a plan view of an antenna that shows the conductor-free space of the fourth embodiment of the present invention.
Figure 31:
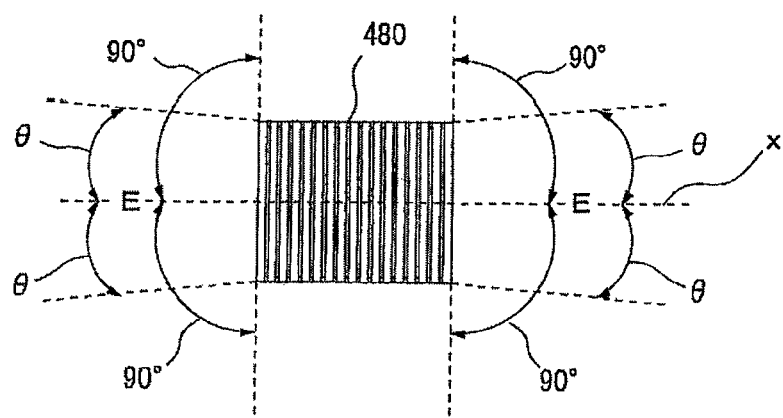
FIG. 31 is a front view of the antenna that shows the conductor-free space of the fourth embodiment of the present invention.

As shown in the plan view of the antenna 480 showing the conductor-free space in FIG. 30 and the front view of the antenna 480 showing the conductor-free space in FIG. 31, the electronic components, conductors, and the like that form the electronic circuit are preferably positioned in a space inside the casing 530 other than a space that is enclosed by an imaginary surface that forms a predetermined angle θ with respect to the coil axis x toward the outside from a position on the edge of the aperture surface of the end part of the antenna 480 in the direction of the coil axis x. The angle θ is, e.g., 5° or more and is preferably 90°. Minute electronic components and conductors may be positioned within the space E if doing so does not dramatically change the magnetic current of the antenna 480.

In the aforedescribed embodiments, configurations were given for the information-acquiring devices 10, 10A, 10B, 500 that can detect both air pressure and temperature, but the configuration may also be such that the information-acquiring device detects either air pressure or temperature, or another physical quantity.

The information-acquiring devices 10, 10A, 10B, 500 in the aforedescribed embodiments were mounted in a tire, but this is not given by way of limitation; it shall be apparent that the information-acquiring device of the present invention can be applied to objects other than tires.

The information-acquiring devices in the aforedescribed embodiments were attached to the rim, but this is not given by way of limitation, and the information-acquiring device may also be attached to locations other than the rim, e.g., the inside surface of the tire.

There can be constructed an information-acquiring device that allows radio waves to be efficiently radiated from an antenna even when a coil-shaped magnetic-field antenna and a transmission circuit are accommodated in a casing having the minimum necessary inside space.

The invention claimed is:

1. An information-acquiring device comprising:
a casing permeable to radio waves;
a transmitter stored inside the casing, the transmitter including:
an electronic circuit having a sensor configured to detect predetermined physical information, and
a transmitting circuit configured to transmit the physical information detected by the sensor,
a coil-shaped antenna configured to radiate a signal containing the physical information as a radio wave having a predetermined frequency, the antenna being connected to the transmitting circuit, and
a main body of the electronic circuit being positioned in a space other than a space present in the direction of a coil axis of the antenna,
the main body of the electronic circuit is positioned in a space other than a space enclosed by an imaginary surface that forms a predetermined angle of 5° or more with respect to the coil axis toward the outside from a position on an edge of an aperture surface of an end part of the antenna in the direction of the coil axis.

2. The information-acquiring device according to claim 1, wherein
the space enclosed by the imaginary surface results when the imaginary surface forms a 90° angle toward the outside with respect to the coil axis.

3. The information-acquiring device according to claim 2, wherein
the electronic circuit and the antenna are provided on the same circuit substrate.

4. The information-acquiring device according to claim 3, wherein
the sensor has a sensor configured to detect surrounding air pressure.

5. The information-acquiring device according to claim 3, wherein
the antenna has a printed wiring formed on the circuit substrate as an element.

6. The information-acquiring device according to claim 2, wherein
the sensor has a sensor configured to detect surrounding air pressure.

7. The information-acquiring device according to claim 2, wherein
the antenna has a printed wiring formed on the circuit substrate as an element.

8. The information-acquiring device according to claim 1, wherein
the electronic circuit and the antenna are provided on the same circuit substrate.

9. The information-acquiring device according to claim 8, wherein
the antenna has a printed wiring formed on the circuit substrate as an element.

10. The information-acquiring device according to claim 8, wherein
the sensor has a sensor configured to detect surrounding air pressure.

11. The information-acquiring device according to claim 1, wherein
the sensor has a sensor configured to detect surrounding air pressure.

* * * * *